United States Patent
Zhang et al.

(10) Patent No.: US 10,250,484 B2
(45) Date of Patent: Apr. 2, 2019

(54) NETWORK SERVICE COMPUTATION SYSTEM

(71) Applicant: Fujitsu Limited, Kawasaki-shi, Kanagawa (JP)

(72) Inventors: Qiong Zhang, Plano, TX (US); Xi Wang, Murphy, TX (US); Paparao Palacharla, Richardson, TX (US); Motoyoshi Sekiya, Richardson, TX (US)

(73) Assignee: FUJITSU LIMITED, Kawasaki (JP)

(*) Notice: Subject to any disclaimer, the term of this patent is extended or adjusted under 35 U.S.C. 154(b) by 212 days.

(21) Appl. No.: 14/882,217

(22) Filed: Oct. 13, 2015

(65) Prior Publication Data

US 2017/0104668 A1    Apr. 13, 2017

(51) Int. Cl.
*H04L 12/727* (2013.01)
*H04L 12/751* (2013.01)
*H04L 12/801* (2013.01)
*H04L 12/915* (2013.01)

(52) U.S. Cl.
CPC ............ *H04L 45/121* (2013.01); *H04L 45/02* (2013.01); *H04L 47/12* (2013.01); *H04L 47/785* (2013.01)

(58) Field of Classification Search
CPC ..... H04L 45/128; H04L 45/121; H04L 47/12; H04L 45/02
See application file for complete search history.

(56) References Cited

U.S. PATENT DOCUMENTS

| 2007/0070909 A1* | 3/2007 | Reeve | H04L 45/00 370/238 |
| 2010/0039939 A1* | 2/2010 | Wang | H04L 45/42 370/238 |
| 2011/0153080 A1* | 6/2011 | Shapiro | B25J 9/1666 700/255 |
| 2011/0242995 A1* | 10/2011 | Zhang | H04L 45/00 370/252 |

OTHER PUBLICATIONS

G. Malewicz et al., "Pregel: A System for Large-Scale Graph Processing," SIGMOD' 10, Indianapolis, Indiana, Copyright 2010 ACM 978-1-4503-0032-2/10/06; 11 pages, Jun. 6-11, 2010.
R. Alimi et al., "Application-Layer Traffic Optimization (ALTO) Protocol," Internet Engineering Task Force, Standards Track document RFC 7285, ISSN: 2070-1721; 91 pages, Sep. 2014.
Shodan—"the world's first search engine for Internet-connected devices," downloaded from https://www.shodan.io/; 4 pages, 2013.
G. Fettweis et al., "The Tactile Internet" ITU-T Technology Watch Report, Aug. 2014; 24 pages.
(Continued)

*Primary Examiner* — Omer S Mian
(74) *Attorney, Agent, or Firm* — Baker Botts L.L.P.

(57) ABSTRACT

A method and system for implementing a network service computation system uses distributed graph processing at a plurality of network controllers corresponding to a plurality of network domains. Each network controller may manage and maintain a network graph for its respective network domain. Each network controller many communicate with nodes (or vertices) in its respective network domain, while the network controllers may communicate with each other for path discovery and computation purposes.

14 Claims, 6 Drawing Sheets

(56) References Cited

OTHER PUBLICATIONS

A. Farrell et al., "A Path Computation Element (PCE)—Based Architecture," Network Working Group, The Internet Society, RFC 4655; 40 pages, Aug. 2006.
J.P. Vasseur et al., "A Backward-Recursive PCE-Based Computation (BRPC) Procedure to Compute Shortest Constrained Inter-Domain Traffic Engineering Label Switched Paths," Internet Engineering Task Force, Standards Track document, RFC 5441; 18 pages, Apr. 2009.
T. Koponen et al., "Onix: A Distributed Control Platform for Large-scale Production Networks," in OSDI 2010; 14 pages, 2010.

* cited by examiner

NETWORK SERVICE COMPUTATION SYSTEM

BACKGROUND

Field of the Disclosure

The present disclosure relates generally to data center networks and, more particularly, to a network service computation system.

Description of the Related Art

With the advent of software-defined networking (SDN), distributed SDN controllers may be employed for administration of certain network domains. In addition, maintaining and managing network topology is a core function of SDN. With the wide scale deployment of SDN, the Internet of Things (IoT), and high-bandwidth wireless systems, large-scale handling of various different kinds of connected network resources is an integral part of providing end-to-end network services.

Typically, when different network domains are managed by different SDN controllers, each SDN controller will maintain a global network map in local memory to enable global path computation and provisioning. A similar arrangement may be used by multilayer multidomain distributed path computation engines (PCEs). Keeping the different copies of the global network map at each network controller updated may be associated with high computational overhead for global synchronization and low scalability, and may undesirably expose network topology.

SUMMARY

In one aspect, a disclosed method includes receiving a network request at a first network controller, the network request specifying a source vertex and a destination vertex. In the method, the source vertex may be located in a first network domain managed by the first network controller, and the destination vertex may be located in a second network domain managed by a second network controller. The method may include performing distributed graph processing at a plurality of network controllers, including the first network controller and the second network controller, corresponding to a plurality of network domains to determine a network path between the source vertex and the destination vertex. In the method, the distributed graph processing may include, within each network domain, identifying a minimum path distance between each vertex in the network domain and the source vertex. In the method, the distributed graph processing may also include sending controller messages among the plurality of network controllers, where each of the controller messages specifies a sending vertex identifier, a target vertex identifier, and the minimum path distance from the source vertex to a target vertex corresponding to the target vertex identifier. In the method, a sending vertex corresponding to the sending vertex identifier may be included in a network domain of a network controller sending the controller message and the target vertex may be included in a network domain of a network controller receiving the controller message. In the method, the distributed graph processing may also include recording, by each network controller for each vertex in the network domain corresponding to the network controller, path information comprising: the minimum path distance from the source vertex to the vertex; and a parent vertex identifier for a parent vertex from the vertex resulting in the minimum path distance to the source vertex.

In any of the disclosed embodiments of the method, the distributed graph processing may begin with the first network controller at the first network domain. In any of the disclosed embodiments of the method, the distributed graph processing may begin with the second network controller at the second network domain.

In any of the disclosed embodiments of the method, sending the controller messages may further include repeating sending the controller messages until all network paths between the source vertex and the destination vertex are recorded, such that the path information does not change based on a given network topology among the plurality of network domains.

In any of the disclosed embodiments, the method may further include aggregating the path information corresponding to the minimum path distance, and, based on the path information aggregated, computing an output path spanning a minimum distance between the source vertex and the destination vertex.

In any of the disclosed embodiments of the method, aggregating the path information may further include aggregating path information only for border vertices for each network domain. In any of the disclosed embodiments of the method, aggregating the path information may be performed by one of: the first network controller and the second network controller, while the method further includes responding, by the first network controller, to the network request with the output path.

In any of the disclosed embodiments of the method, the plurality of network controllers may be SDN controllers.

In any of the disclosed embodiments, the method may further include receiving new path information for a vertex after the path information is recorded for the vertex, and, when the new path information specifies a new value for the minimum path distance that is greater than the minimum path distance recorded in the path information, discarding the new path information.

Additional disclosed aspects for implementing a network service computation system using distributed graph processing include an article of manufacture comprising a non-transitory, computer-readable medium, and computer executable instructions stored on the computer-readable medium. Another aspect for implementing a network service computation system using distributed graph processing includes a network system comprising a plurality of network controllers associated with a respective plurality of network domains. A further aspect for implementing a network service computation system using distributed graph processing includes a network controller comprising a memory, a processor coupled to the memory, and computer executable instructions stored on the memory.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As will be described herein, a network service computation system is disclosed that provides a scalable framework for providing end-to-end network services, including responding to path computation requests across different network domains. The network service computation system disclosed herein may promote locality for cloud applications and may be versatile to address a variety of network problems. The network service computation system disclosed herein applies vertex-centric distributed graph processing that enables different vertices to exchange path information iteratively using controller messages until convergence for a given network topology is achieved. In the network service computation system disclosed herein, each network controller does not maintain a global network topology, but rather, generates a network graph with topology information relating to a network request for the vertices within the network domain managed by the network controller. Thus, in the network service computation system disclosed herein, the vertices do not send path information to each other, but instead, each network controller managing a network domain will send messages to each vertex in the network domain, and the network controllers will communicate with each other with controller messages. In this manner, a scalable network service computation system may be realized that can offer low latency for global path discovery and computation in the network.

Figure 1:
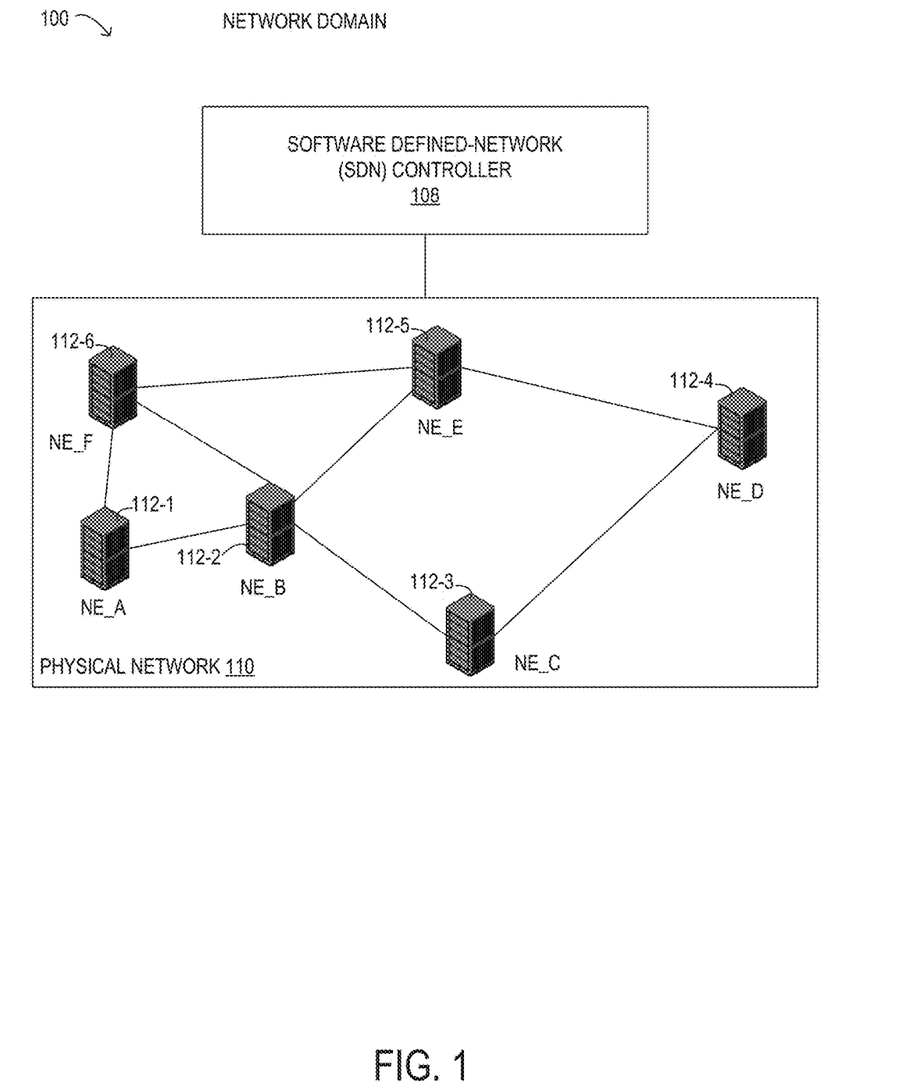
FIG. 1 is a block diagram of selected elements of an embodiment of a network domain.

Turning now to the drawings, FIG. 1 illustrates an example embodiment of a network domain 100, which is based on vertices that are individual network elements (NE). In FIG. 1, network domain 100 is shown including software defined-network (SDN) controller 108, and physical network 110. In FIG. 1, an underlying optical network, represented by physical network 110, may be an optical transport network (OTN) or a flexible optical data plane (e.g., flexible transceivers) configured to adjust the bandwidth of connections.

In FIG. 1, SDN controller 108 may manage network domain 100, shown comprising network elements 112. Network elements 112 may represent various types of network functionality, such as switches, routers, etc. and may include hardware to interconnect various types of physical interfaces. Network domain 100 comprises network element NE_A 112-1, network element NE_B 112-2, network element NE_C 112-3, network element NE_D 112-4, network element NE_E 112-5, and network element NE_F 112-6, along with connections between the network elements that may have different distances. Thus, network domain 100 may represent a network topology for a single network domain managed by SDN controller 108. When larger networks include multiple network domains, each individual network domain may be managed by a respective SDN controller.

To facilitate conventional path computation among the different network domains, a multilayer multidomain distributed path computation engine (PCE) may be used, in which a global network map is maintained at each SDN controller, thereby allowing each SDN controller to perform path computation in response to network demand requests for the global network. However, such a distributed path computation architecture for distributed SDN controllers may be associated with certain disadvantageous properties. For example, storing the global network map at each SDN controller may consume significant amount of memory and may expose physical network 110 globally throughout different domains in the network, which may be undesirable. Because network topologies may be constantly changing, global synchronization may be performed to keep all the global network maps updated, which may involve significant network overhead. Furthermore, when a legacy routing protocol is used, discovery of network topology as well as path computation may rely upon network elements 112 sending messages to each other to discover any changes in network paths and reach, while the results of the network topology communication are then updated at each SDN controller 108. When the global network includes a large number of domains and network elements, the resulting cascade of communications involved for path computation and distributed network operations may be inefficient and slow.

As disclosed in further detail herein, network domain 100 may be included in a network service computation system that uses distributed graph processing and controller messages between a plurality of network controllers, such as SDN controller 108, associated with a respective plurality of network domains, such as physical network 110. Each network controller may execute a network service computation engine (NSCE) as disclosed herein, to collaboratively implement the network service computation system.

Figure 2:
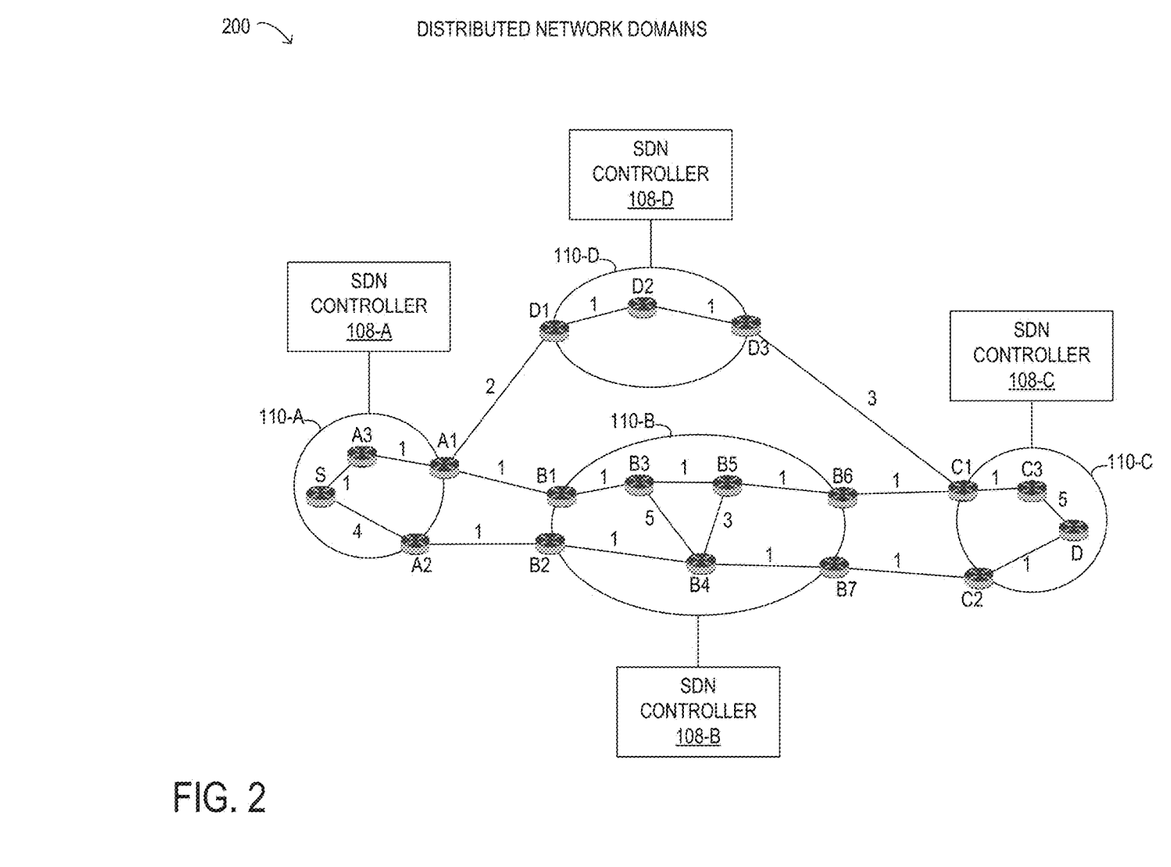
FIG. 2 is a network diagram of selected elements of an embodiment of distributed network domains.

Referring now to FIG. 2, selected elements of an embodiment of distributed network domains 200 are shown as a network diagram. Distributed network domains 200 represent an exemplary embodiment of a multidomain network managed by a respective plurality of SDN controllers 108 for implementing a network service computation system, as disclosed herein. Although distributed network domains 200 are shown as a specific network topology, it will be understood that various different types and sizes of networks and different numbers of network domains may be used with the network service computation system disclosed herein. Distributed network domains 200 are shown as a schematic illustration and are not drawn to scale.

In FIG. 2, distributed network domains 200 include a plurality of domains 110 comprised of individual vertices. A vertex may represent any of a variety of network nodes, such as a switch, a router, a network element, a data center, a sub-network, a sub-domain, among others. Thus, each vertex may be enabled to provide network connectivity to other vertices, as well as computational resources, such as for providing network services and supporting network applications. As shown, a connection link is provided between vertices and is labeled in FIG. 2 with an integer value representing a relative path distance for the connection link. It is noted that the connection links may be intra-domain and inter-domain.

The vertices in distributed network domains 200 represent a reachable network of vertices that may provide potential paths between a source vertex S and a destination vertex D. Specifically, SDN controller 108-A may manage domain 110-A that includes source vertex S, and vertices A1, A2, and A3; SDN controller 108-B may manage domain 110-B that includes vertices B1, B2, B3, B4, B5, B6, and B7; SDN controller 108-C may manage domain 110-C that includes vertices C1, C2, C3, and destination vertex D; and SDN controller 108-D may manage domain 110-D that includes vertices D1, D2, and D3. In distributed network domains 200, each SDN controller 108 may communicate with vertices in its own respective domain 110, while the vertices may refrain from communicating with each other. The SDN controllers 108 may also communicate with each other and may be networked together (not shown for descriptive clarity) using any suitable topology, such as a ring, a star, a bus, among others. In some embodiments, the communication among SDN controllers 108 may employ a sideband network channel, or other network connection for management purposes, that does not otherwise interfere with the network connections between vertices, which may represent a payload network offered as a commercial service to customers by a service provider.

Figure 3:
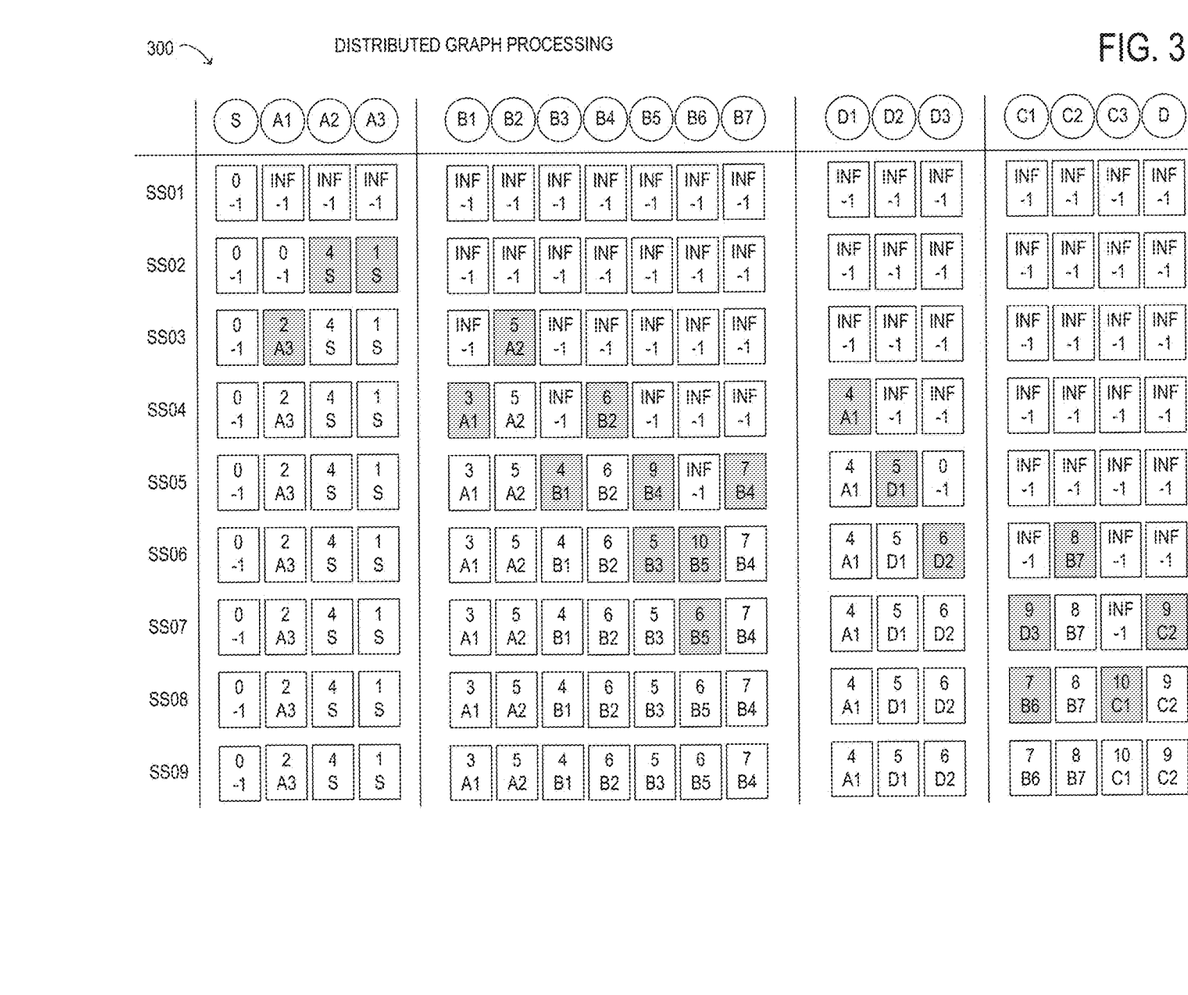
FIG. 3 is a block diagram of selected elements of an embodiment of network graph processing.

Referring now to FIG. 3, selected elements of an embodiment of distributed graph processing 300 are shown. Distributed graph processing shows iterations of supersteps SS01-SS09 that are sequentially executed. Each superstep may involve receiving controller messages or information at an SDN controller 108, performing local actions at respective network domain 110, and then sending out controller messages to other SDN controllers 108. It is noted that distributed graph processing 300 may be employed with a suitable network operating system using distributed network domains 200. In addition to controlling each vertex, each SDN controller 108 may keep track of the network topology of respective network domain 110.

In distributed graph processing 300, a box with 2 values that comprise path information is shown being recorded for each vertex within each network domain 110: a minimum path distance from the source vertex to the vertex; and a vertex identifier of a parent vertex resulting in the minimum path distance. A parent vertex is a next vertex along a defined path, in this case, the defined path is the path corresponding to the minimum path distance. A value of zero (0) for the minimum path distance indicates the source vertex S. A value of INF for the minimum path distance indicates an undefined value. A value of −1 for a vertex ID indicates no value for the vertex ID. Accordingly, source vertex S has path information values of (0, −1) throughout distributed graph processing 300 for each superstep. The vertices associated with each SDN controller 108 are grouped together, showing the path information stored by each SDN controller 108.

Additionally, in distributed graph processing 300, controller messages are sent after each superstep is performed. The controller messages are inter-domain messages sent with respect to a sending vertex and a target vertex that are in different domains. Each controller message may include: a sending vertex identifier; a target vertex identifier, and a minimum distance from source vertex S to the target vertex. The controller messages are not shown in FIG. 2 for descriptive clarity, but are described below for SS01-SS09.

In FIG. 3, distributed graph processing 300 begins with SS01 as an initialization, with all vertices except source vertex S having path information values, or simply values, of (INF, −1), signifying that a network request has been received specifying source index S, which has values (0, −1). After SS01, no controller messages are sent but within domain 110-A, source vertex S discovers its neighbor vertices A2 and A3 and updates their values to (4, S) and (1, S) accordingly (updates are shown with a darkened background in FIG. 2). After SS02, a controller message (A2, B2, 5) is sent from SDN controller 108-A to SDN controller 108-B, informing that vertex B2 is distance 5 from source vertex S via vertex A2. At SS03, within domain 108-A, vertex A3 reports to SDN controller 108-A that neighbor vertex A1 is distance 1 away, and SDN controller 108-A updates the values for vertex A1 to (2, A3) accordingly. Then, it is determined that vertices B1 and D1 neighbor vertex A1. After SS03, controller messages (A1, B1, 3), (A1, D1, 4), and (B2, A2, 6) are sent, in a corresponding manner as described. The message (B2, A2, 6) does not result in a change to the path information for vertex A2, because vertex A2 already stores a smaller distance value. At SS04, SDN controller 108-B updates values for vertex B1 to (3, A1) and for vertex B4 to (6, B2), while SDN controller 108-D updates values for vertex D1 to (4, A1). After SS04, controller messages (B1, A1, 4) and (D1, A1, 6) are sent, which do not change the path information for vertex A1. At SS05, SDN controller 108-B updates values for vertex B3 to (4, B1), for vertex B5 to (9, B4), and for vertex B7 to (7, B4), while SDN controller 108-D updates values for vertex D2 to (5, D1). After SS05, controller message (B7, C2, 8) is sent. At SS06, SDN controller 108-B updates values for vertex B5 to (5, B3) and for vertex B6 to (10, B5), SDN controller 108-D updates values for vertex D3 to (6, D2), and SDN controller 108-C updates values for vertex C2 to (8, B7). After SS06 controller message (D3, C1, 9) is sent, along with controller messages (C2, B7, 9) and (B6, C1, 7), which are ignored or discarded. At SS07, SDN controller 108-B updates values for vertex B6 to (6, B5), and SDN controller 108-C updates values for vertex C1 to (9, D3) and for destination vertex D to (9, C2). After SS07 controller message (B6, C1, 7) is sent, along with controller messages (C1, D3, 12) and (C1, B6, 10), which are ignored or discarded. At SS08, SDN controller 108-C updates values for vertex C1 to (7, B6) and for vertex C3 to (10, C1). After SS08, controller messages (C1, B6, 8) and (C1, D3, 10) are sent, which are ignored or discarded. Thus, as SS09, distributed graph processing 300 may converge and no further updates or controller messages are sent, indicating that the path information values stored at each SDN controller 108 are 'hot' and represent the actual network topology of distributed network domains 200.

It is noted that in various embodiments, different numbers of supersteps may result in convergence of distributed graph processing 300. Although distributed graph processing 300 is shown for distributed network domains 200, the procedure described above may be applied to any collection of network domains, including very large numbers of network domains having very large numbers of vertices. Although originating with source vertex S, it is noted that distributed graph processing 300 may be performed in a reverse direction, beginning with destination vertex D, to attain a similar or equivalent result. Furthermore, in some embodiments, each SDN controller 108 may send controller messages only for border vertices that are at an edge of domain 110, such that internal topology of domain 110 is not revealed during distributed graph processing 300.

After distributed graph processing 300 converges, in one embodiment, SDN controllers 108-B, 108-C, 108-D may send all their path information back to SDN controller 108-A, enabling computation of the shortest path. For example, based on SS09, destination vertex D values (9, C2) indicated that the parent vertex is C2, vertex C2 values (8, B7) indicate that the parent vertex is B7, vertex B7 values (7, B4) indicate that the parent vertex is B4, vertex B4 values (6, B2) indicate that the parent vertex is B2, vertex B2 values (5, A2) indicate that the parent vertex is A2, vertex A2 values (4, S) indicate that source vertex S has been reached. In other embodiments, the path information may be collected and computed by SDN controller 108-D where destination vertex D resides. Then, at SDN controller 108-A, the computed minimum distance path may be output in response to the network request.

Figure 4A:
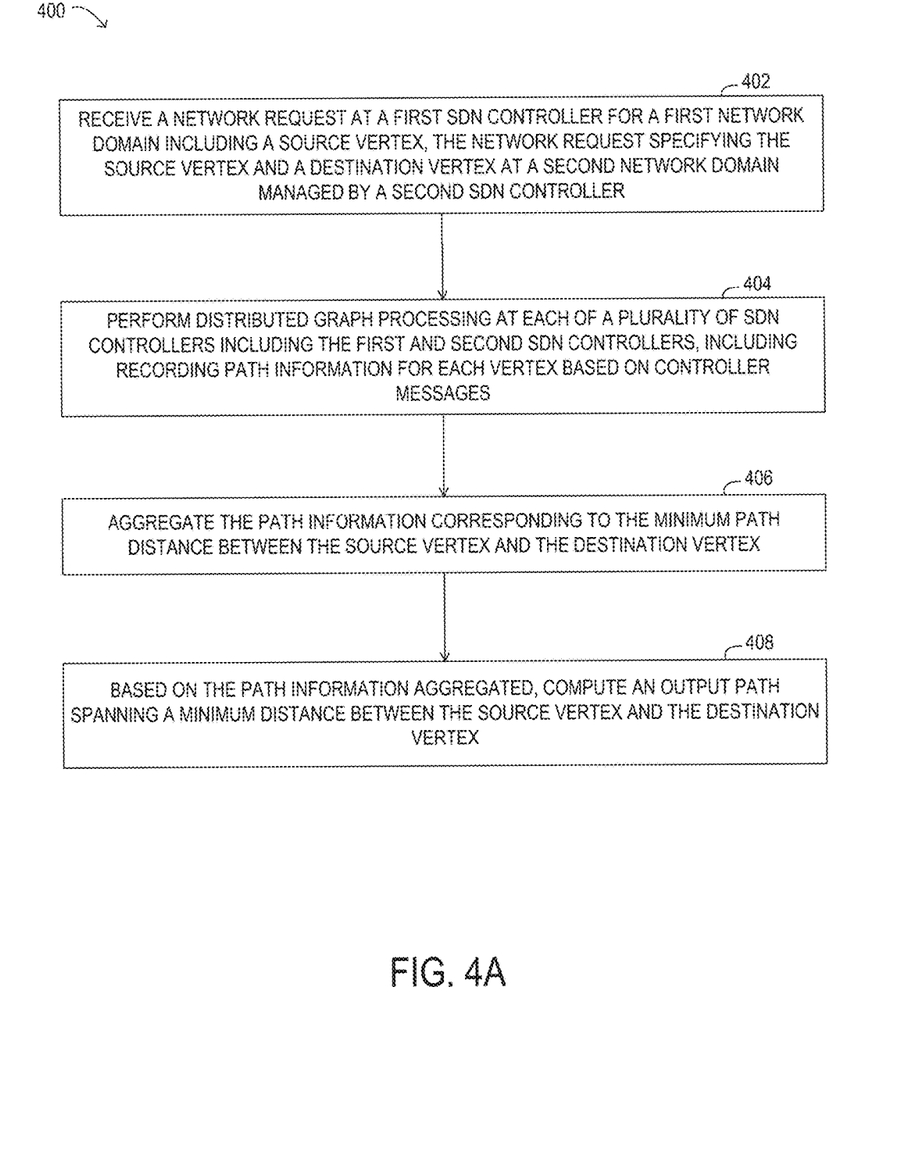
FIG. 4A is a flow chart depicting selected elements of an embodiment of a method for implementing a network service computation system using distributed graph processing.

Referring now to FIG. 4A, selected elements of an embodiment of method 400 for implementing a network service computation system using distributed graph processing, as described herein, is shown in flow chart format. In various embodiments, method 400 may be implemented using network service computation engine 530 (see FIG. 5), respectively executed at a plurality of network controllers, to implement distributed graph processing 300 (see FIG. 3). It is noted that certain operations depicted in method 400 may be rearranged or omitted, as desired.

Method 400 may begin at step 402 by receiving a network request at a first SDN controller for a first network domain including a source vertex, the network request specifying the source vertex and a destination vertex at a second network domain managed by a second SDN controller. At step 404, distributed graph processing may be performed at each of a plurality of SDN controllers including the first and second SDN controllers, including recording path information for each vertex based on controller messages. At step 406, the path information corresponding to the minimum path distance between the source vertex and the destination vertex may be aggregated. At step 408, based on the path information aggregated, an output path may be computed spanning a minimum distance between the source vertex and the destination vertex.

Figure 4B:
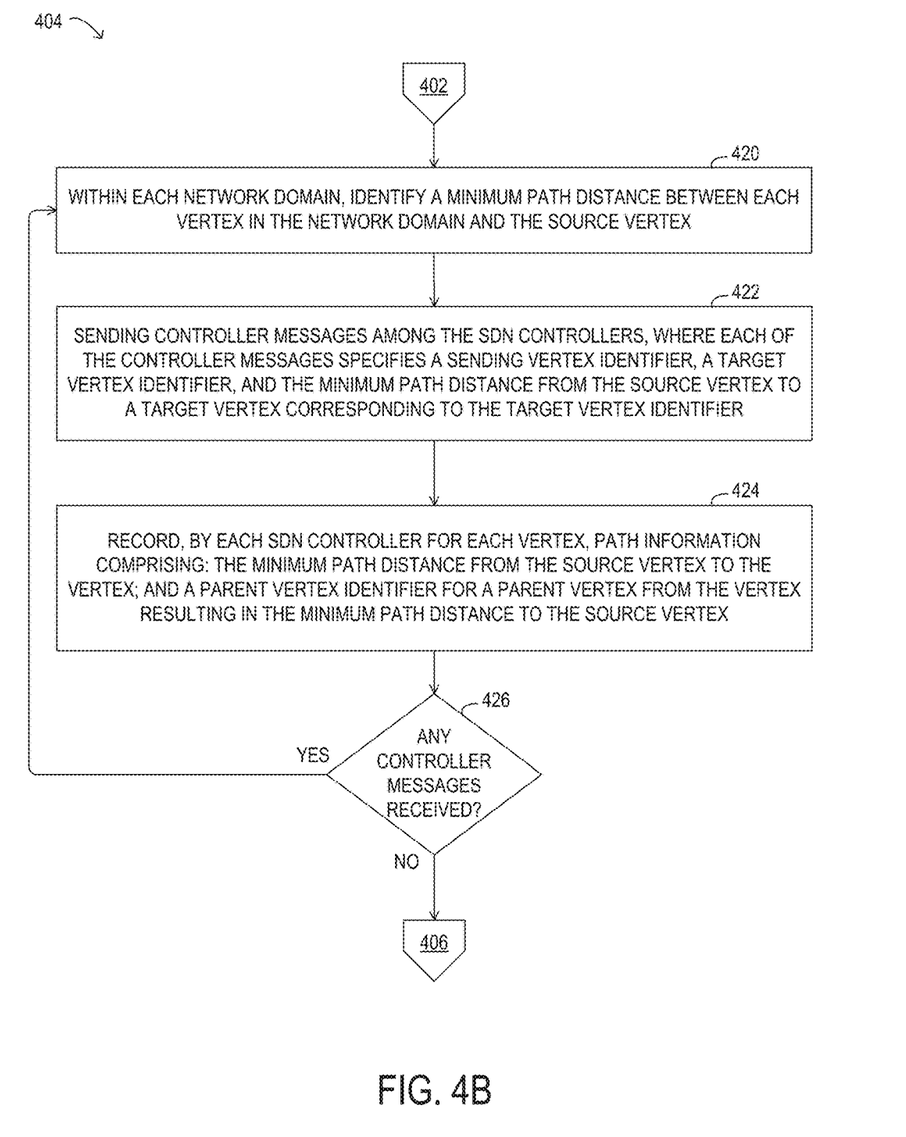
FIG. 4B is a flow chart depicting selected elements of an embodiment of a method for implementing a network service computation system using distributed graph processing.

Referring now to FIG. 4B, selected elements of an embodiment of method 404 for implementing a network service computation system using distributed graph processing, as described herein, is shown in flow chart format. Method 404 may represent at least a portion of operation 404 in method 400 (see FIG. 4A). In various embodiments, method 404 may be implemented using network service computation engine 530 (see FIG. 5), respectively executed at a plurality of network controllers, to implement distributed graph processing 300 (see FIG. 3). It is noted that certain operations depicted in method 404 may be rearranged or omitted, as desired.

Method 404 may begin after step 402, within each network domain, at step 420, by identifying a minimum path distance between each vertex in the network domain and the source vertex. At step 422, controller messages may be sent among the SDN controllers, where each of the controller messages specifies a sending vertex identifier, a target vertex identifier, and the minimum path distance from the source vertex to a target vertex corresponding to the target vertex identifier. At step 424, by each SDN controller for each vertex, path information may be recorded comprising: the minimum path distance from the source vertex to the vertex; and a parent vertex identifier for a parent vertex from the vertex resulting in the minimum path distance to the source vertex. After step 424, a decision may be made at step 426 whether any controller messages have been received. When the result of step 426 is YES and additional controller messages have been received, method 404 may loop back to step 420. When the result of step 426 is NO, method 404 may end and proceed to step 406 in method 400.

Figure 5:
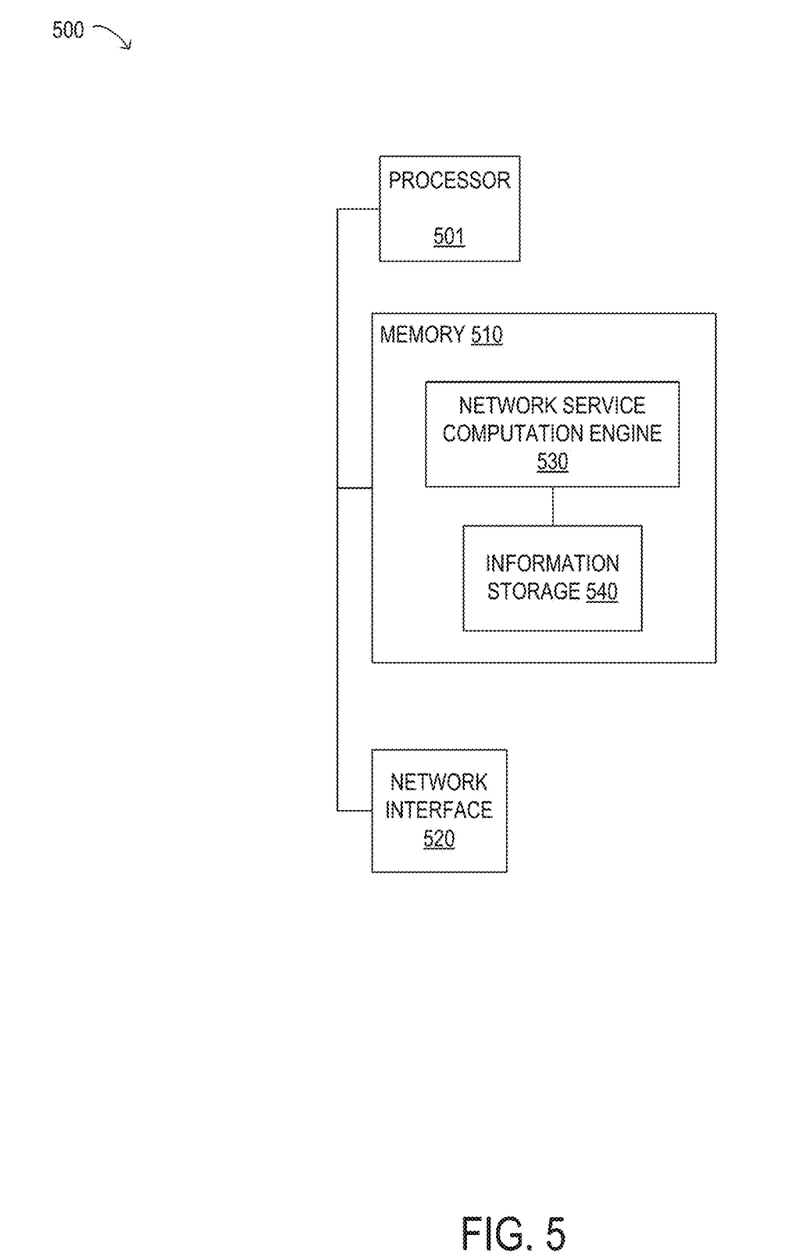
FIG. 5 is a block diagram of selected elements of an embodiment of a network controller.

Referring now to FIG. 5, a block diagram of selected elements of an embodiment of network controller 500 is illustrated. In FIG. 5, network controller 500 is represented as a computer system including physical and logical components for implementing a network service computation system using distributed graph processing, as described herein, and may accordingly include processor 501, memory 510, and network interface 520. Processor 501 may represent one or more individual processing units and may execute program instructions, interpret data, and process data stored by memory 510 or management system 500. In various embodiments, network controller 500 may be an SDN controller.

In FIG. 5, memory 510 may be communicatively coupled to processor 501 and may comprise a system, device, or apparatus suitable to retain program instructions and data for a period of time (e.g., computer-readable media). Memory 510 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and any suitable selection or array of volatile or non-volatile memory. Non-volatile memory refers to a memory that retains data after power is turned off. It is noted that memory 510 may include different numbers of physical storage devices, in various embodiments.

As shown in FIG. 5, memory 510 may include network service computation engine (NSCE) 530, which, in collaboration with other instances of network controller 500, may implement a network service computation system using distributed graph processing, such as to perform methods 400 and 404 described in FIG. 4, among other functionality described herein.

As disclosed herein, a method and system for implementing a network service computation system uses distributed graph processing at a plurality of network controllers corresponding to a plurality of network domains. Each network controller may manage and maintain a network graph for its respective network domain. Each network controller many communicate with nodes (or vertices) in its respective network domain, while the network controllers may communicate with each other for path discovery and computation purposes.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method, comprising:
receiving a network request at a first network controller, the network request specifying a source vertex and a destination vertex, wherein the source vertex is located in a first network domain managed by the first network controller, and wherein the destination vertex is located in a second network domain managed by a second network controller;

performing distributed graph processing at a plurality of network controllers, including the first network controller and the second network controller, corresponding to a plurality of network domains to determine a network path between the source vertex and the destination vertex, the distributed graph processing including:

within each network domain, executing a plurality of supersteps, wherein each superstep includes identifying a minimum path distance between each vertex in the network domain and the source vertex;

sending, subsequent to each superstep, a controller message among the plurality of network controllers, wherein the controller message includes a first field specifying a sending vertex identifier, a second field specifying a target vertex identifier, and a third field specifying the minimum path distance from the source vertex to a target vertex corresponding to the target vertex identifier, wherein a sending vertex corresponding to the sending vertex identifier is included in a network domain of a network controller sending the controller message and the target vertex is included in a network domain of a network controller receiving the controller message;

repeating, after each superstep, sending a controller message until all network paths between the source vertex and the destination vertex are recorded, wherein the path information does not change based on a given network topology among the plurality of network domains;

recording, by each network controller for each vertex in the network domain corresponding to the network controller, path information comprising: the minimum path distance from the source vertex to the vertex; and a parent vertex identifier for a parent vertex from the vertex resulting in the minimum path distance to the source vertex;

receiving new path information for the respective vertex after path information is recorded for a respective vertex; and discarding new path information for the respective vertex when the new path information for the respective vertex specifies a value for the minimum path distance greater than the minimum path distance recorded in the path information; and providing at least one network service to at least one customer of a service provider using an output path, wherein the output path is computed based on the path information.

2. The method of claim 1, wherein the distributed graph processing begins with the first network controller at the first network domain.

3. The method of claim 1, wherein the distributed graph processing begins with the second network controller at the second network domain.

4. The method of claim 1, further comprising:
aggregating the path information corresponding to the minimum path distance; and
based on the path information aggregated, computing an output path spanning a minimum distance between the source vertex and the destination vertex.

5. The method of claim 4, wherein the aggregating the path information further comprises:
aggregating path information only for border vertices for each network domain.

6. The method of claim 4, wherein the aggregating the path information is performed by one of: the first network controller and the second network controller, and further comprising:
responding, by the first network controller, to the network request with the output path.

7. The method of claim 1, wherein the plurality of network controllers are software-defined network controllers.

8. A network system comprising a plurality of network controllers associated with a respective plurality of network domains, including a first network controller and a second network controller, wherein each of the plurality of network controllers further comprises:
a memory;
a processor coupled to the memory; and
processor-executable instructions stored on the memory, wherein the plurality of network controllers are enabled to execute the instructions to:

receive a network request at the first network controller, the network request specifying a source vertex and a destination vertex, wherein the source vertex is located in a first network domain managed by the first network controller, and wherein the destination vertex is located in a second network domain managed by a second network controller;

perform distributed graph processing at the plurality of network controllers to determine a network path between the source vertex and the destination vertex, the distributed graph processing causing the processor to execute the instructions to:

within each network domain, execute a plurality of supersteps, wherein each superstep includes a minimum path distance between each vertex in the network domain and the source vertex;

send, subsequent to each superstep, a controller message among the plurality of network controllers, wherein the controller message includes a first field specifying a sending vertex identifier, a second field specifying a target vertex identifier, and a third field specifying the minimum path distance from the source vertex to a target vertex corresponding to the target vertex identifier, wherein a sending vertex corresponding to the sending vertex identifier is included in a network domain of a network controller sending the controller message and the target vertex is included in a network domain of a network controller receiving the controller message;

repeat, after each superstep, sending a controller message until all network paths between the source vertex and the destination vertex are recorded, wherein the path information does not change based on a given network topology among the plurality of network domains;

record, by each network controller for each vertex in the network domain corresponding to the network controller, path information comprising: the minimum path distance from the source vertex to the vertex; and a parent vertex identifier for a parent vertex from the vertex resulting in the minimum path distance to the source vertex;

receive new path information for the respective vertex after path information is recorded for a respective vertex; and discard new path information for the respective vertex when the new path information for the respective vertex specifies a value for the minimum path distance greater than the minimum path distance recorded in the path information; and provide at least one network service to at least one customer of a service provider using an output path, wherein the output path is computed based on the path information.

9. The network system of claim 8, wherein the distributed graph processing begins with the first network controller at the first network domain.

10. The network system of claim 8, wherein the distributed graph processing begins with the second network controller at the second network domain.

11. The network system of claim 8, further comprising instructions to:

aggregate the path information corresponding to the minimum path distance; and based on the path information aggregated, compute an output path spanning a minimum distance between the source vertex and the destination vertex.

12. The network system of claim 11, wherein the instructions to aggregate the path information further comprise instructions to:

aggregate only border nodes for each network domain.

13. The network system of claim 11, wherein the instructions to aggregate the path information are performed by one of: the first network controller and the second network controller, and further comprising instructions to:

respond, by the first network controller, to the network request with the output path.

14. The network system of claim 8, wherein the plurality of network controllers are software-defined network controllers.

\* \* \* \* \*